United States Patent [19]
Gerber et al.

[11] Patent Number: 5,808,985
[45] Date of Patent: Sep. 15, 1998

[54] TILT ERROR SIGNAL PRODUCING APPARATUS USING MULTIPLE TRACKING ERROR SIGNALS

[75] Inventors: Ronald E. Gerber, Rochester; Edward C. Gage, Fairport, both of N.Y.

[73] Assignee: Eastman Kodak Company, Rochester, N.Y.

[21] Appl. No.: 826,697

[22] Filed: Apr. 7, 1997

[51] Int. Cl.⁶ .................................................... G11B 7/09
[52] U.S. Cl. ................................. 369/44.32; 369/44.41
[58] Field of Search ........................... 369/44.32, 44.23, 369/44.37, 44.38, 44.41, 44.62, 44.14

[56] References Cited

U.S. PATENT DOCUMENTS

| | | | |
|---|---|---|---|
| 5,065,380 | 11/1991 | Yokota | 369/44.41 |
| 5,206,848 | 4/1993 | Kusano et al. | 369/44.32 |
| 5,302,834 | 4/1994 | Murao | 369/44.32 |
| 5,523,989 | 6/1996 | Ishibashi | 369/44.32 |

OTHER PUBLICATIONS

U.S. application No. 08/742,237, filed Oct. 31, 1996, entitled Multi–Element Prism for Optical Heads by Timothy S. Gardner, David B. Kay and Ronald E. Gerber.

U.S. application No. 08/742,239, filed Oct. 31, 1996, entitled Multi–Element Prism for Optical Heads by Ronald E. Gerber, Timothy S. Gardner and David B. Kay.

*Primary Examiner*—Thang V. Tran
*Attorney, Agent, or Firm*—Pamela R. Crocker

[57] ABSTRACT

An apparatus for producing a tilt error signal representative of the tilt of an optical disk is disclosed. The apparatus includes a source of laser light for focusing a laser beam onto the disk and reflecting such beam from the disk, a beamsplitter positioned to receive the reflected light beam and to direct the light beam in a first direction, and a structure for separating the reflected light beam from the beamsplitter into at least four portions and for producing detection signals for each portion. The apparatus further includes circuitry responsive to the detection signals for producing first and second tracking error signals, the first and second tracking error signals being produced by different combinations of the detection signals and both being sensitive to cross-track diffraction, and circuitry responsive to the first and second tracking error signals for producing the tilt error signal.

12 Claims, 4 Drawing Sheets

TILT ERROR SIGNAL PRODUCING APPARATUS USING MULTIPLE TRACKING ERROR SIGNALS

FIELD OF THE INVENTION

The present invention relates to optical disks, and in particular, to providing an apparatus for producing a tilt error signal representative of the tilt of the optical disk.

BACKGROUND OF THE INVENTION

Optical disks include a transparent substrate having a recording layer where data is recorded and stored. Data can be stored on the recording layer in various forms, including pits, marks, and magneto-optic domains. In an optical disk system, a laser beam is focused by an objective lens through the transparent substrate and onto the stored data. The laser beam is then reflected back through the same objective lens used for focusing. Since surface defects on the disk, such as dust particles and scratches, can have dimensions on the order of the focused spot size of the laser beam, the laser beam is typically focused onto the rear surface of the disk substrate to ensure that any surface defects will be out of focus with respect to the recording layer containing the data. Any spherical aberration caused by focusing the laser beam through the substrate will generally be corrected by the design of the objective lens.

Typically, the optical disk is not perfectly flat, and any local deviations from flatness appear as a slight tilt of the front surface of the disk with respect to the incident beam. Additional tilt components can be caused by spindle misalignment or disk droop. The disk tilt causes a degradation of the focused spot quality, which results in a decrease in the carrier-to-noise ratio during readout, an increase in crosstalk and intersymbol interference, and a reduction in recording sensitivity.

Future generations of optical disks will most likely utilize shorter wavelengths and higher numerical aperture objective lenses, both of which increase the areal data density of the disks. Unfortunately, the sensitivity to disk tilt increases if the wavelength and numerical aperture quantities are adjusted to meet a higher data density. Several systems have been proposed that attempt to dynamically correct for the effects of disk tilt, for example, by tilting the objective lens or the entire optical head.

In the presence of disk tilt, the tracking servo generally does not adequately return the peak irradiance in the focused spot to the center of the data track. When the tracking error signal (TES) is zero, the remaining distance between the peak irradiance and the center of the track is called track offset. The value of track offset is a property of the scheme used to generate the TES; each detection scheme possesses a unique value of track offset. Further discussion of track offset can be found in commonly-assigned U.S. patent application Ser. No. 08/742,237, filed Oct. 31, 1996 and commonly-assigned U.S. patent application Ser. No. 08/742,239, filed Oct. 31, 1996.

Typical optical disk systems generate only one TES. The drawback of this approach is that there is still a residual amount of track offset. More importantly, there is no way to extract disk tilt information from only one TES.

SUMMARY OF THE INVENTION

Accordingly, it is an object of this invention to provide apparatus for detecting the amount of disk tilt by using multiple tracking error signals.

This object is achieved by apparatus for producing a tilt error signal representative of the tilt of an optical disk, comprising:

(a) a source of laser light for focusing a laser beam onto the disk and reflecting such beam from the disk;

(b) a beamsplitter positioned to receive the reflected light beam and to direct the light beam in a first direction;

(c) means for separating the reflected light beam from the beamsplitter into at least four portions and for producing detection signals for each portion;

(d) means responsive to the detection signals for producing first and second tracking error signals, the first and second tracking error signals being produced by different combinations of the detection signals and both being sensitive to cross-track diffraction; and (e) means responsive to the first and second tracking error signals for producing a tilt error signal.

ADVANTAGES

An advantage of the present invention is that disk tilt can be detected without the need for additional optical components.

Another advantage of the present invention is that the disk tilt detection scheme is readily applicable to many head designs in which the reflected beam from the optical disk is separated into several portions.

DETAILED DESCRIPTION OF THE INVENTION

Figure 1:
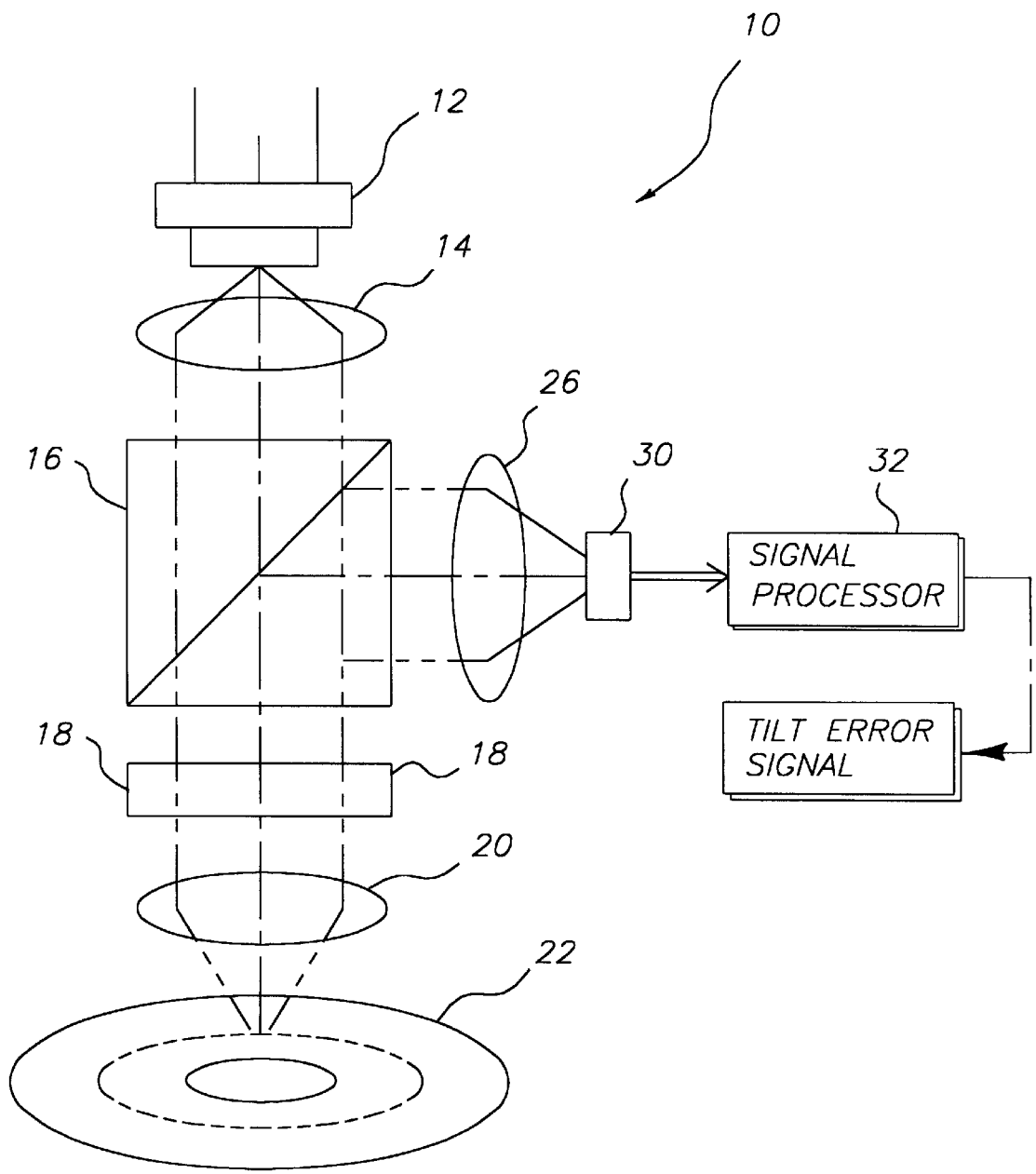
FIG. 1 is a block diagram of a representative apparatus in accordance with the present invention.

Turning first to FIG. 1, a first embodiment of the present invention is shown. FIG. 1 shows an apparatus 10 which can be used to produce a tilt error signal in accordance with the present invention. The apparatus 10 includes a source of laser light 12 which produces a beam of light that is substantially linearly polarized. The source of laser light 12 can be, for example, a laser diode. The light beam is collimated by a lens 14 and is directed to a beamsplitter 16. The light beam passes through the beamsplitter 16 and a waveplate 18. The waveplate 18 changes the polarization state of the light beam from linear to circular. The light beam is then collected by a lens 20 and is focused onto the surface of an optical disk 22. The light beam is reflected from the optical disk 22 and passes back through the lens 20, the waveplate 18 and into the beamsplitter 16. The waveplate 18 changes the polarization state of the reflected beam from circular to linear, with the plane of polarization being perpendicular to that of the incident beam. The reflected light beam is then directed by the beamsplitter 16 in a new direction and is collected by a lens 26 which partially focuses the reflected light beam onto a detector 30. Detection signals are produced by the detector 30 and are delivered to a signal processor 32 which produces a tilt error signal representative of the tilt of the optical disk 22 in response to multiple tracking error signals. This tilt error signal can be used by a tilt servo (not shown) to compensate for the effect of the disk tilt. Compensation can be done in a number of different ways, such as tilting the lens 20.

Figure 2:
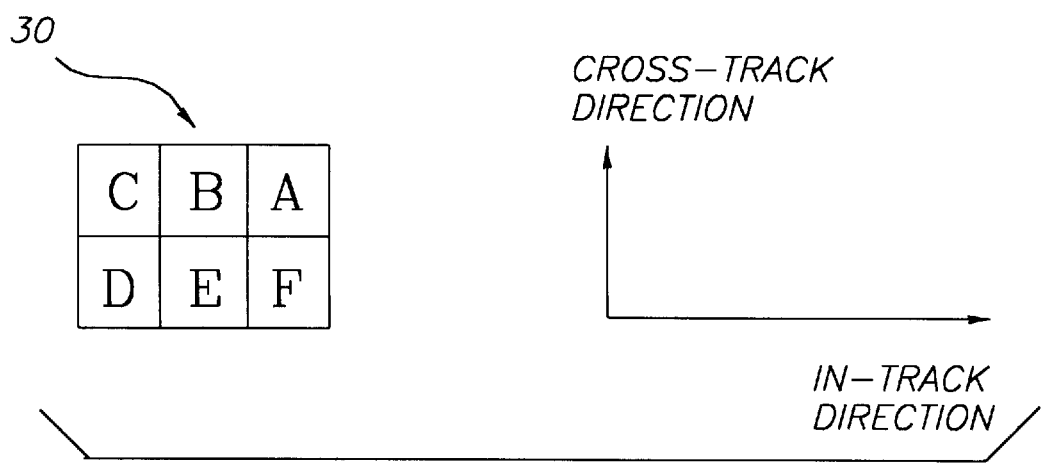
FIGS. 2 and 3 respectively show different arrangements of detector photocells which can be employed in the apparatus of FIG. 1.

Turning now to FIG. 2, a rectangular detector 30 is shown to have six photocells designated by A, B, C, D, E, and F. The cross-track and in-track directions are shown by arrows. As will be explained below, the combination of signals produced by this detector 30 can be used by the signal processor 32 to produce two tracking error signals. The two tracking error signals are sensitive to cross-track diffraction.

A number of equations will now be discussed which are used by the signal processor 32 to generate the tilt error signal in accordance with the present invention. A particular detection signal will correspond to its associated photocell. For example, photocell "A" produces detection signal "A". It will be understood by those skilled in the art that the signal processor 32 can digitize these analog signals so as to facilitate signal processing. A first tracking error signal (TES) is generated by the following equation:

$$TES=(A+B+C)-(D+E+F)$$

A second tracking error signal (TES') is generated by the following equation:

$$TES'=(B-E)$$

The signal processor 32 then generates a tilt error signal in response to the first tracking error signal, TES, and the second tracking error signal, TES'. The tilt error signal is the value of one tracking error signal when the other tracking error signal equals zero.

Figure 3:
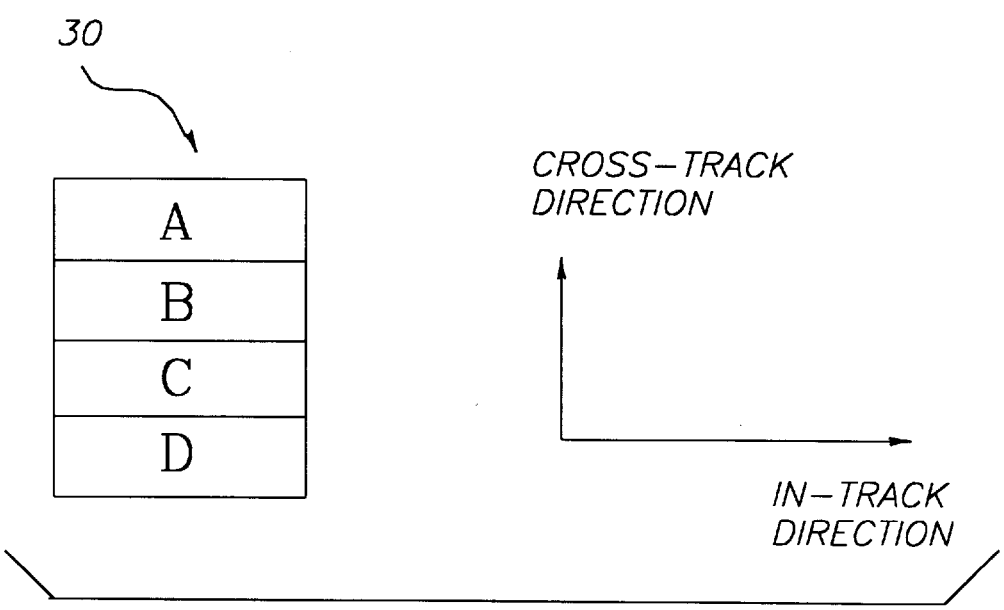

Turning now to FIG. 3, a second configuration of detector 30 is shown. This detector 30 includes four photocells designated by A, B, C, and D. A first tracking error signal (TES) is generated by the following equation:

$$TES=(A+B)-(C+D)$$

A second tracking error signal (TES') is generated by the following equation:

$$TES'=(A-D)$$

A tilt error signal is generated in response to the first tracking error signal, TES, and the second tracking error signal, TES', with the tilt error signal being the value of one tracking error signal when the other tracking error signal equals zero.

Figure 4A:
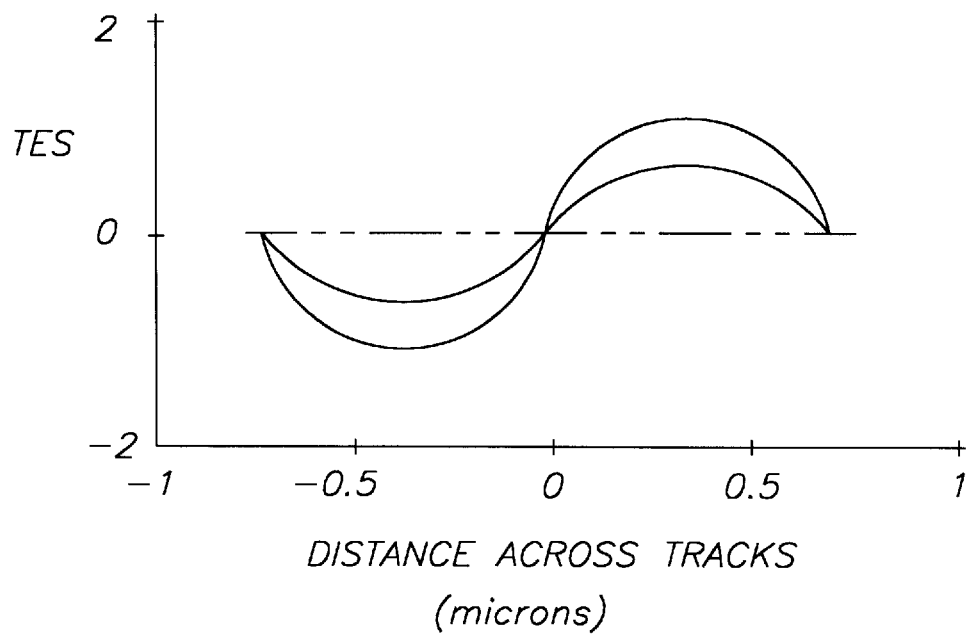
FIGS. 4A and 4B are plots of tracking error signals versus position of the focused spot on the optical disk relative to the center of a track.
Figure 4B:
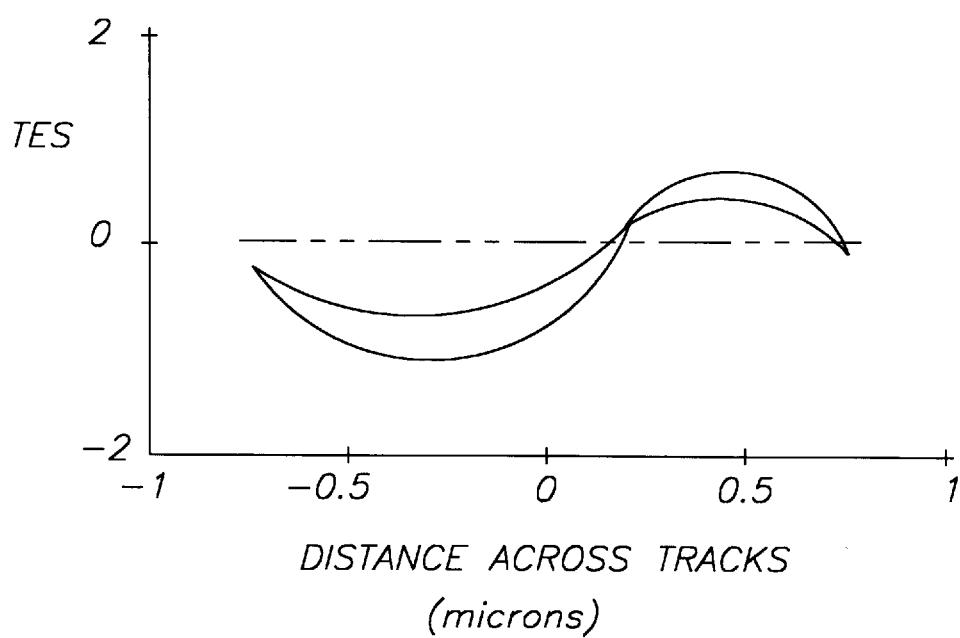

Turning now to FIGS. 4A and 4B, plots of tracking error signals versus position of the focused spot on the optical disk 22 relative to the center of a track are shown. FIG. 4A shows the tracking error signals with no disk tilt. The two tracking error signals equal zero when the focused spot on the optical disk 22 is centered on a track. FIG. 4B shows the tracking error signals when disk tilt is present. Such disk tilt can be measured by apparatus 10 in accordance with the present invention. When one tracking error signal equals zero, the value of the other tracking error signal is the tilt error signal. This tilt error signal is directly proportional to or representative of the amount of tilt of the optical disk 22. The tilt error signal is produced by the signal processor 32 as noted above.

Figure 5:
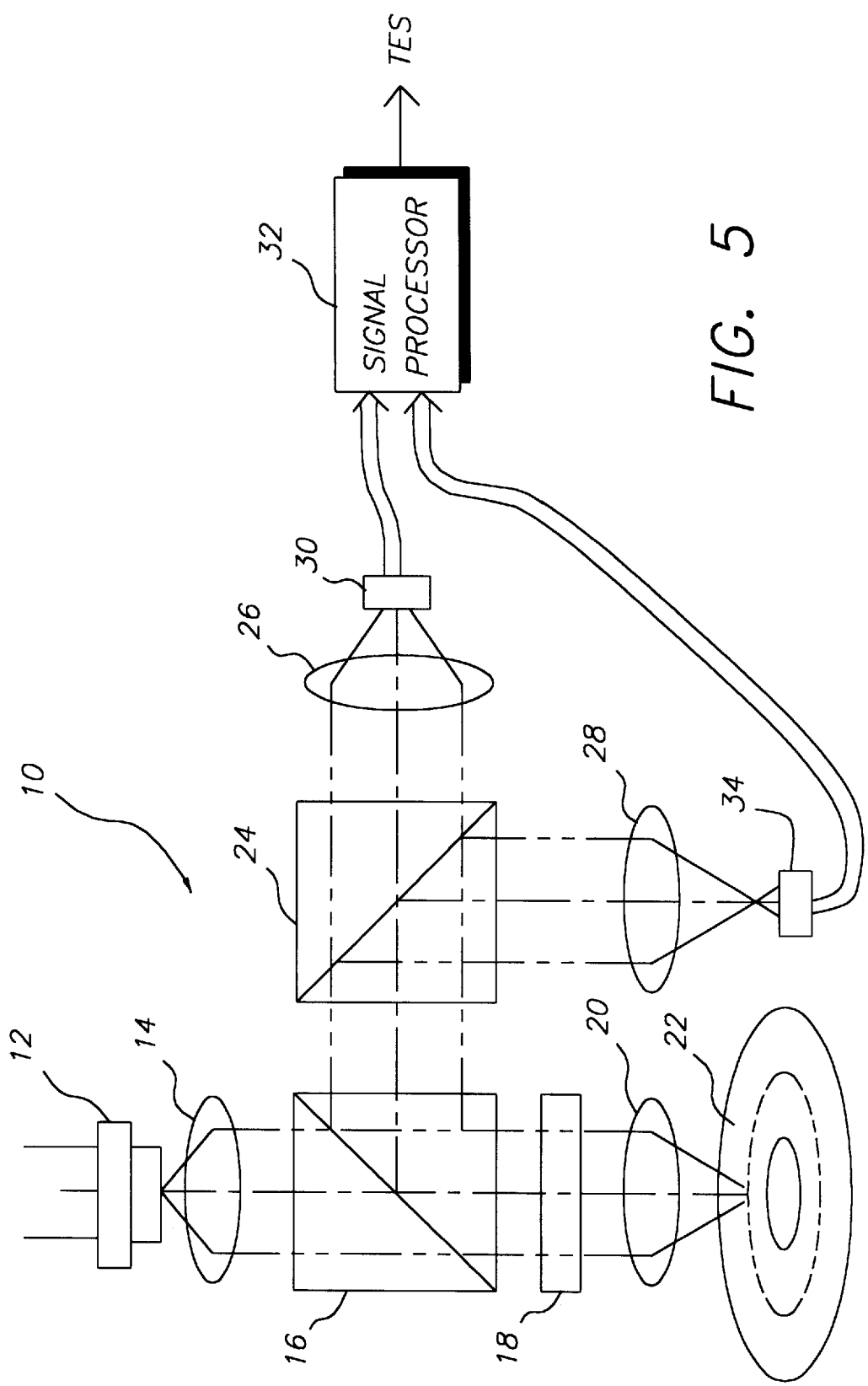
FIG. 5 is a block diagram of a second embodiment of apparatus in accordance with the present invention.

Referring now to FIG. 5, a second embodiment of the present invention is shown. Where reference numerals correspond to those in FIG. 1, the same elements are used which provide the same function. However, in FIG. 5 a second beamsplitter 24 is positioned to receive the reflected light beam from the beamsplitter 16. The second beamsplitter 24 directs the reflected light beam into two directions. A lens 26 collects the reflected light beam in a first direction and partially focuses it onto the detector 30. A lens 28 collects the reflected light beam in a second direction and partially focuses it onto a detector 34. Each of the detectors 30 and 34 includes at least four photocells. These photocells generates detection signals which are processed by the signal processor 32 to produce the tilt error signal. Detection signals from specific photocells in detectors 30 and 34 are used by the signal processor 32 to produce the first tracking error signal, and detection signals from different photocells in detectors 30 and 34 are used to produce the second tracking error signal. In any event, these tracking error signals are sensitive to cross-track diffraction. The signal processor 32 then produces a tilt error signal in response to the first and second tracking error signals.

The detectors described in accordance with the present invention have at least four photocells to detect different portions of the reflected light beam and to produce detection signals for each portion. However, it would be understood by those skilled in the art that other elements could be used to separate the reflected light beam into at least four portions, including a multi-element prism or a diffraction grating.

In addition, it would be understood by those skilled in the art that either the first or the second tracking error signal, or a combination of the first and second tracking error signals, could be provided to a tracking servo for maintaining the optical spot on track. The combination can be derived in such a manner by the signal processor so as to produce a new tracking error signal which can be used to maintain optimum tracking in the presence of disk tilt.

The invention has been described in detail with particular reference to certain preferred embodiments thereof. However, it will be appreciated that variations and modifications can be effected by a person of ordinary skill in the art without departing from the spirit and scope of the invention.

| PARTS LIST | |
|---|---|
| 10 | apparatus |
| 12 | laser light source |
| 14 | lens |
| 16 | beamsplitter |
| 18 | waveplate |
| 20 | lens |
| 22 | optical disk |
| 24 | beamsplitter |
| 26 | lens |
| 28 | lens |
| 30 | detector |
| 32 | signal processor |
| 34 | detector |

What is claimed is:

1. Apparatus for producing a tilt error signal representative of the tilt of an optical disk, comprising:

(a) a source of laser light for focusing a laser beam onto the disk and reflecting such beam from the disk;

(b) a beamsplitter positioned to receive the reflected light beam and to direct the light beam in a first direction;

(c) means for separating the reflected light beam from the beamsplitter into at least four portions and for producing detection signals for each portion;

(d) means responsive to the detection signals for producing first and second tracking error signals, the first and second tracking error signals being produced by different combinations of the detection signals and both being sensitive to cross-track diffraction; and (e) means responsive to the first and second tracking error signals for producing the tilt error signal.

2. The apparatus of claim 1 wherein the tilt error signal producing means is responsive to one of the tracking error signals being at a predetermined level for indicating that the other tracking error signal is representative of the tilt error signal.

3. The apparatus of claim 2 wherein the detector includes six photocells arranged in a rectangular pattern and having three top and three bottom photocells with combination of detection signals generated by the top and bottom photocells for producing the first and second tracking error signals.

4. The apparatus of claim 2 wherein the detector includes four photocells arranged in a rectangular pattern so that detection signals generated by the top two photocells when combined with detection signals generated by the bottom two photocells produce the first and second tracking error signals.

5. Apparatus for producing a tilt error signal representative of the tilt of an optical disk, comprising:

(a) a source of laser light for focusing a laser beam onto the disk and reflecting such beam from the disk;

(b) a beamsplitter positioned to receive the reflected light beam and to direct the light beam in a first direction;

(c) a detector positioned to receive the reflected light beam from the beamsplitter and having at least four photocells, each of the photocells producing a detection signal;

(d) means responsive to the detection signals for producing first and second tracking error signals, the first and second tracking error signals being produced by different combinations of the detection signals and both being sensitive to cross-track diffraction; and (e) means responsive to the first and second tracking error signals for producing the tilt error signal.

6. The apparatus of claim 5 wherein the tilt error signal producing means is responsive to one of the tracking error signals being at a predetermined level for indicating that the other tracking error signal is representative of the tilt error signal.

7. The apparatus of claim 6 wherein the detector includes six photocells arranged in a rectangular pattern and having three top and three bottom photocells with combination of detection signals generated by the top and bottom photocells for producing the first and second tracking error signals.

8. The apparatus of claim 6 wherein the detector includes four photocells arranged in a rectangular pattern so that detection signals generated by the top two photocells when combined with detection signals generated by the bottom two photocells produce the first and second tracking error signals.

9. Apparatus for producing a tilt error signal representative of the tilt of an optical disk, comprising:

(a) a source of laser light for focusing a laser beam onto the disk and reflecting such beam from the disk;

(b) a first beamsplitter positioned to receive the reflected light beam and to direct the light beam in a first direction;

(c) a second beamsplitter positioned to receive the reflected light beam directed in the first direction and for splitting such beams and directing them in second and third directions, respectively;

(d) first and second detectors positioned to respectively receive the first and second light beams reflected from the second beamsplitter, each such detector having at least four photocells and each of the photocells producing a detection signal;

(e) means responsive to the detection signals for producing first and second tracking error signals, the first and second tracking error signals being produced by different combinations of the detection signals and both being sensitive to cross-track diffraction; and (f) means responsive to the first and second tracking error signals for producing the tilt error signal.

10. The apparatus of claim 9 wherein the tilt error signal producing means is responsive to one of the tracking error signals being at a predetermined level for indicating that the other tracking error signal is representative of the tilt error signal.

11. The apparatus of claim 10 wherein the first and second detectors each include six photocells.

12. The apparatus of claim 10 wherein the first and second detectors each include four photocells.

* * * * *